(12) United States Patent
Liu

(10) Patent No.: US 10,753,530 B2
(45) Date of Patent: Aug. 25, 2020

(54) QUICK-RELEASE MOUNTING STRUCTURE OF ACTION CAMERA CASING

(71) Applicant: FUL CHEE ENT CO., LTD., Taichung (TW)

(72) Inventor: Yu-Chen Liu, Taichung (TW)

(73) Assignee: FUL CHEE ENT CO., LTD., Taichung (TW)

(*) Notice: Subject to any disclaimer, the term of this patent is extended or adjusted under 35 U.S.C. 154(b) by 22 days.

(21) Appl. No.: 16/261,581

(22) Filed: Jan. 30, 2019

(65) Prior Publication Data

US 2020/0240574 A1 Jul. 30, 2020

(51) Int. Cl.
*G03B 17/56* (2006.01)
*F16M 11/06* (2006.01)
*F16M 11/04* (2006.01)
*F16M 11/12* (2006.01)

(52) U.S. Cl.
CPC ......... *F16M 11/041* (2013.01); *F16M 11/126* (2013.01); *G03B 17/561* (2013.01)

(58) Field of Classification Search
CPC .... G03B 17/56; G03B 17/561; F16M 11/041; F16M 11/126
See application file for complete search history.

(56) References Cited

U.S. PATENT DOCUMENTS

2016/0252801 A1* 9/2016 Harrison ................ G03B 17/08
396/27

* cited by examiner

Primary Examiner — Minh Q Phan
(74) Attorney, Agent, or Firm — Raymond Y. Chan; David and Raymond Patent Firm

(57) ABSTRACT

A quick-release mounting structure of an action camera casing includes a casing for accommodating an action camera, an insert member, a circular sleeve, a fixing member, and a quick-release assembly. An underside of the casing is provided with a coupling portion. The insert member is in a cylindrical shape and has a pivot end at an upper end thereof. The pivot end and the coupling portion are pivotally connected together by a coupling bolt. The circular sleeve is provided with an axial slit. An underside of the circular sleeve is provided with a coupling end. The insert member is inserted into the circular sleeve. The fixing member is provided with a pivot portion. The pivot portion and the coupling end are pivotally connected together by a bolt assembly. The quick-release assembly includes a fastening collar. The fastening collar is fitted onto the circular sleeve.

10 Claims, 6 Drawing Sheets

QUICK-RELEASE MOUNTING STRUCTURE OF ACTION CAMERA CASING

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a quick-release mounting structure of an action camera casing, and more particularly to an action camera casing having a quick-release assembly to achieve quick assembly disassembly and adjustment of angle and direction.

Description of Related Arts

A conventional action camera casing, as shown in FIG. 1 and FIG. 2, comprises a casing 10 for accommodating an action camera, a connecting arm 13, and a fixing member 19. The underside of the casing 10 is provided with a coupling portion 11. The coupling portion 11 has two parallel lugs 12. The lugs 12 each have a through hole 121 in the same axial direction. One end of the connecting arm 13 is provided with a pivot end 14. The pivot end 14 has three parallel pivot plates 15, such that the pivot end 14 is formed with two grooves 16. The pivot plates 15 each have a pivot hole 151 in the same axial direction. The lugs 12 are inserted in the grooves 16 of the pivot end 14, respectively. The pivot end 14 and the coupling portion 11 are pivotally connected together by a first bolt assembly 1. The first bolt assembly 1 includes a screw 2 and a nut 3. The screw 2 is inserted through the pivot holes 151 of the pivot plates 15 and the through holes 121 of the lugs 12, and is locked by the nut 3. The other end of the connecting arm 13 is provided with a coupling end 17. The coupling end 17 has two parallel coupling plates 18. The coupling plates 18 each have a coupling hole 181 in the same axial direction. The fixing member 19 is provided with a pivot portion 20. The pivot portion 20 has three parallel pivot plates 21 so that the pivot portion 20 is formed with two grooves 22. The pivot plates 21 each have a shaft hole 211 in the same axial direction. The coupling plates 18 are inserted into the grooves 22 of the pivot portion 20, respectively. The pivot portion 20 and the coupling end 17 are pivotally connected together by a second bolt assembly 4. The second bolt assembly 4 includes a screw 5 and a nut 6. The screw 5 is inserted through the shaft holes 211 of the pivot plates 21 and the coupling holes 181 of the coupling plates 18, and then is locked by the nut 6. With the above structure, the casing 10 equipped with the action camera can be adjusted to change the angle of shooting as needed by loosening the first bolt assembly 1 and the second bolt assembly 4. However, the above assembly still has the following disadvantages:

1. Since the action camera has various functions, the fixing member 19 may be a seat to which a helmet is attached, one end of a selfie stick, or a clip seat for an object to be clamped, etc. In other words, the casing 10 may be mounted to the fixing member 19 of a different object according to the purpose of use. If the casing 10 equipped with the action camera is removed from the fixing member 19 to be assembled with another fixing member 19, the nut 6 of the second bolt assembly 4 is unscrewed, and the coupling end 17 and the pivot portion 20 are disengaged from the screw 5 so as to detach the casing 10 from the fixing member 19. When the other fixing member 19 is installed, the screw 5 is inserted through the coupling holes 181 of the coupling plates 18 and the shaft holes 211 of the pivot plates 21 and then is locked by the nut 6. This is time-consuming and inconvenient for use.

2. When the screw 2 of the first bolt assembly 1 or the screw 5 of the second bolt assembly 4 is pulled away from the connecting arm 13, the casing 10 having the action camera loses its connection suddenly. The casing 10 has no gripping portion and is highly likely to fall down.

3. When the fixing member 19 is not moved, only the pitch angle of the casing 10 can be adjusted and the horizontal direction cannot be changed, which is inconvenient for use.

Accordingly, the inventor of the present invention has devoted himself based on his many years of practical experiences to solve these problems.

SUMMARY OF THE PRESENT INVENTION

The primary object of the present invention is to solve the above problems and to provide a quick-release mounting structure of an action camera casing. The main technical and purpose of the present invention is that the present invention utilizes an insert member pivotally connected to a casing in cooperation with a quick-release assembly fitted to a circular sleeve to achieve the effect and purpose of quick disassembly, assembly and adjustment of angle.

In order to achieve the above object, the present invention provides a quick-release mounting structure of an action camera casing, comprising a casing for accommodating an action camera, an insert member, a circular sleeve, a fixing member, and a quick-release assembly. An underside of the casing is provided with a coupling portion. The coupling portion has two parallel lugs. The insert member is in a cylindrical shape and has a pivot end at an upper end thereof. The pivot end is provided with two slots parallel to an axial direction of the insert member. Two sides of the pivot end are formed with a first side plate and a second side plate, respectively. A partition is disposed between the two slots. The lugs are inserted in the slots of the pivot end, respectively. The pivot end and the coupling portion are pivotally connected together by a coupling bolt. The circular sleeve is provided with an axial slit. An underside of the circular sleeve is provided with a coupling end. The coupling end has two parallel coupling plates and a space defined between the coupling plates. The insert member is inserted into the circular sleeve. The fixing member is provided with a pivot portion. The pivot portion has three parallel pivot plates so that the pivot portion is formed with two grooves. The coupling plates are inserted into the grooves of the pivot portion, respectively. The pivot portion and the coupling end are pivotally connected together by a bolt assembly. The quick-release assembly includes a fastening collar. The fastening collar is fitted onto the circular sleeve. The quick-release assembly is configured to tighten the fastening collar for fastening the circular sleeve so that the circular sleeve is pressed to clamp the insert member and the pivot end is deformed to clamp the coupling portion.

In an embodiment of the present invention, the quick-release assembly further includes a shaft having an eccentric rotating handle, a pressing block and a nut. The fastening collar has a C-shaped body portion. Two ends of the C-shaped body portion are provided with end seats each having an aperture. The C-shaped body portion is fitted onto the circular sleeve. One end of the shaft, facing away from the eccentric rotating handle, is provided with an external thread. The shaft is inserted through the pressing block and the apertures of the end seats. The nut is screwed to the external thread of the shaft. The eccentric rotating handle is pulled for the pressing block to tighten the end seats of the fastening collar.

In an embodiment of the present invention, the eccentric rotating handle is substantially L-shaped to lean against a periphery of the C-shaped body portion when the eccentric rotating handle is fastened.

In an embodiment of the present invention, a central portion of the partition is formed with a notch extending to bottoms of the slots. A first magnetic member is disposed in the notch close to a bottom of the insert member. The underside of the circular sleeve is provided with a second magnetic member that is located at a central portion of the space and corresponds to the first magnetic member.

In an embodiment of the present invention, the lugs each have a through hole. The first side plate has a pivot hole. The second side plate has a screw hole corresponding to the pivot hole. A distal end of the coupling bolt is provided with a threaded portion. The coupling bolt is inserted through the pivot hole of the first side plate and the notch of the partition, and the threaded portion of the coupling bolt is screwed into the screw hole of the second side plate.

In an embodiment of the present invention, the first magnetic member and the second magnetic member are neodymium-iron-boron magnets.

In an embodiment of the present invention, one of the first magnetic member and the second magnetic member is a neodymium-iron-boron magnet, and the other is made of a ferromagnetic material.

In an embodiment of the present invention, an outer circumference of the circular sleeve is provided with a radial limiting edge. An outer diameter of the circular sleeve above the limiting edge is less than an outer diameter of the circular sleeve below the limiting edge. The limiting edge abuts against a lower edge of the C-shaped body portion to obtain an optimal fitting position.

In an embodiment of the present invention, the outer circumference of the circular sleeve above the limiting edge is provided with a positioning hole. The C-shaped body portion is provided with a positioning screw hole. The positioning screw hole is aligned with the positioning hole. A set screw is locked into the positioning screw hole and extends into the positioning hole.

In an embodiment of the present invention, the coupling plates each have a coupling hole. The pivot plates each have a shaft hole. The bolt assembly includes a screw and a nut. The screw is inserted through the shaft holes of the pivot plates and the coupling holes of the coupling plates and locked by the nut.

With the above structure, the insert member is inserted in the circular sleeve and can be loosened and fastened by the quick-release assembly, thereby achieving the effect of fastening and loosening the pivots.

DETAILED DESCRIPTION OF THE PREFERRED EMBODIMENT

Embodiments of the present invention will now be described, by way of example only, with reference to the accompanying drawings.

Figure 1:
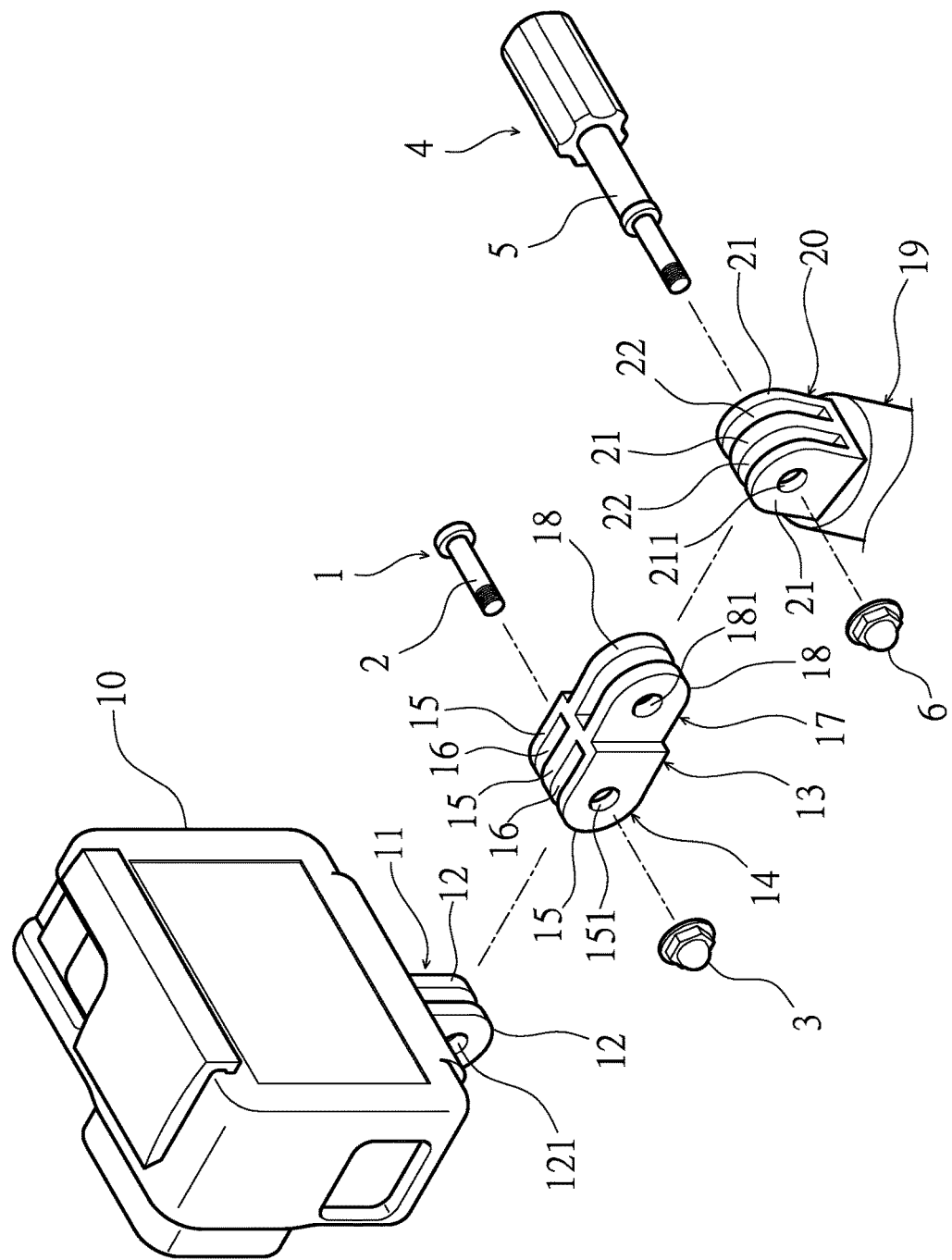
FIG. 1 is an exploded view of a conventional action camera casing.
Figure 2:
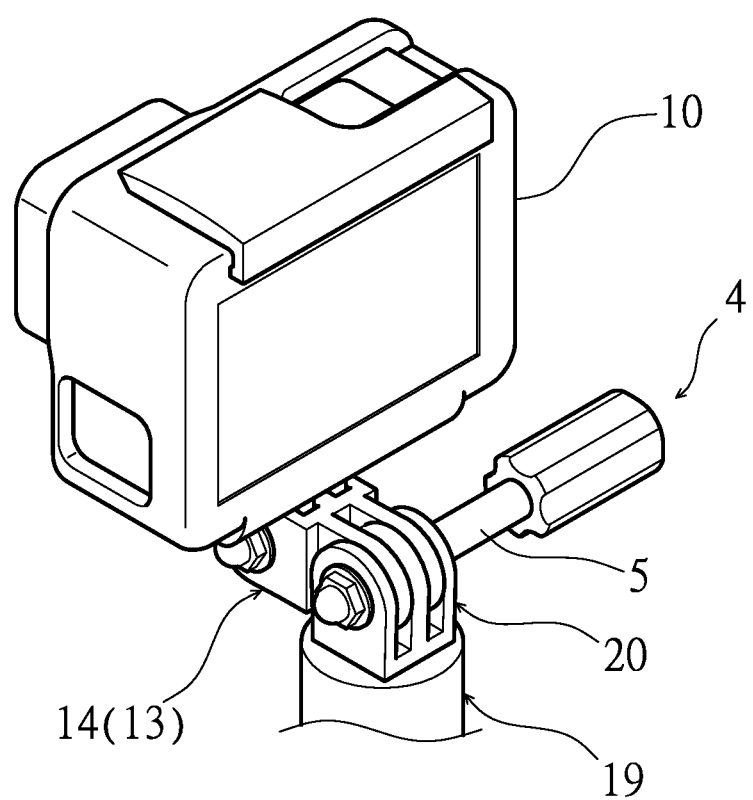
FIG. 2 is a perspective view of the conventional action camera casing.
Figure 3:
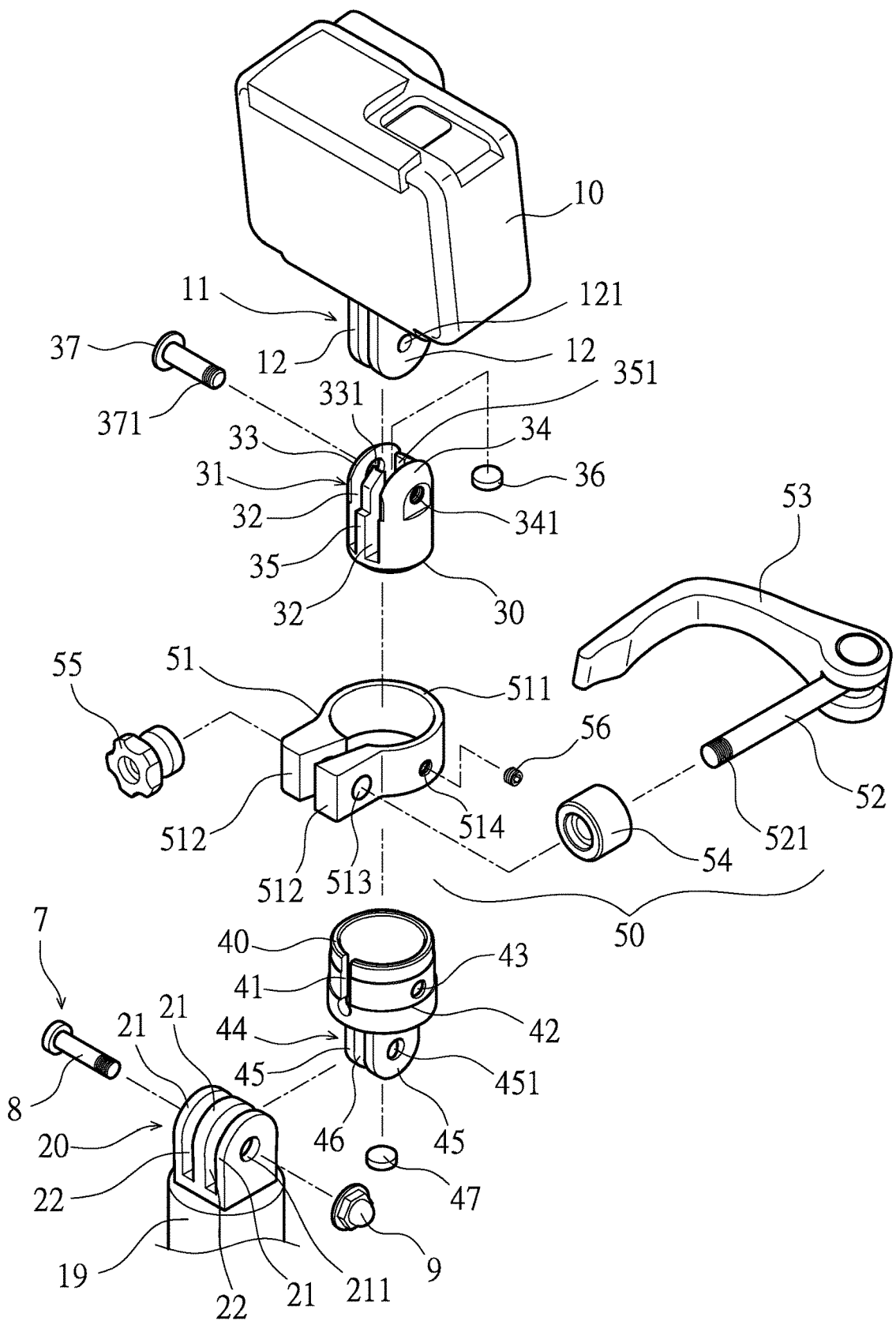
FIG. 3 is an exploded view of the present invention.
Figure 4:
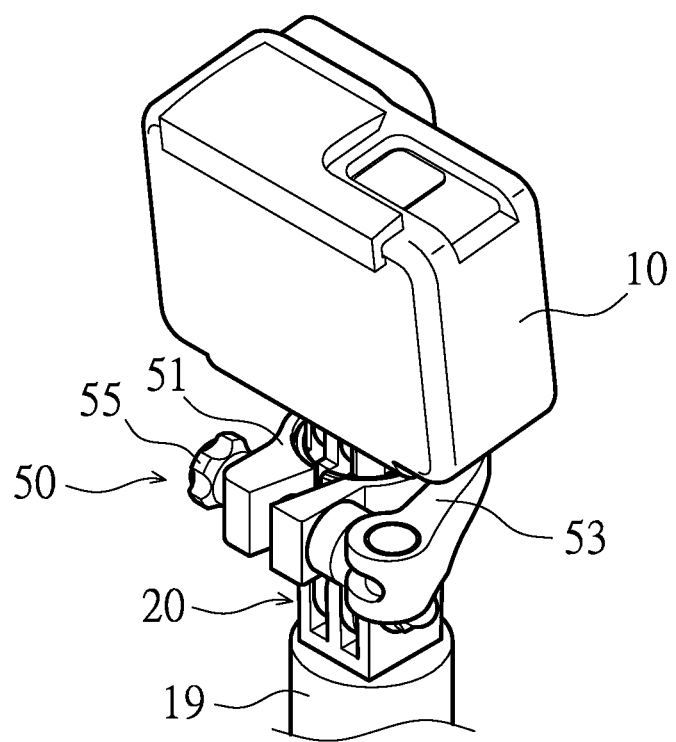
FIG. 4 is a perspective view of the present invention.
Figure 5:
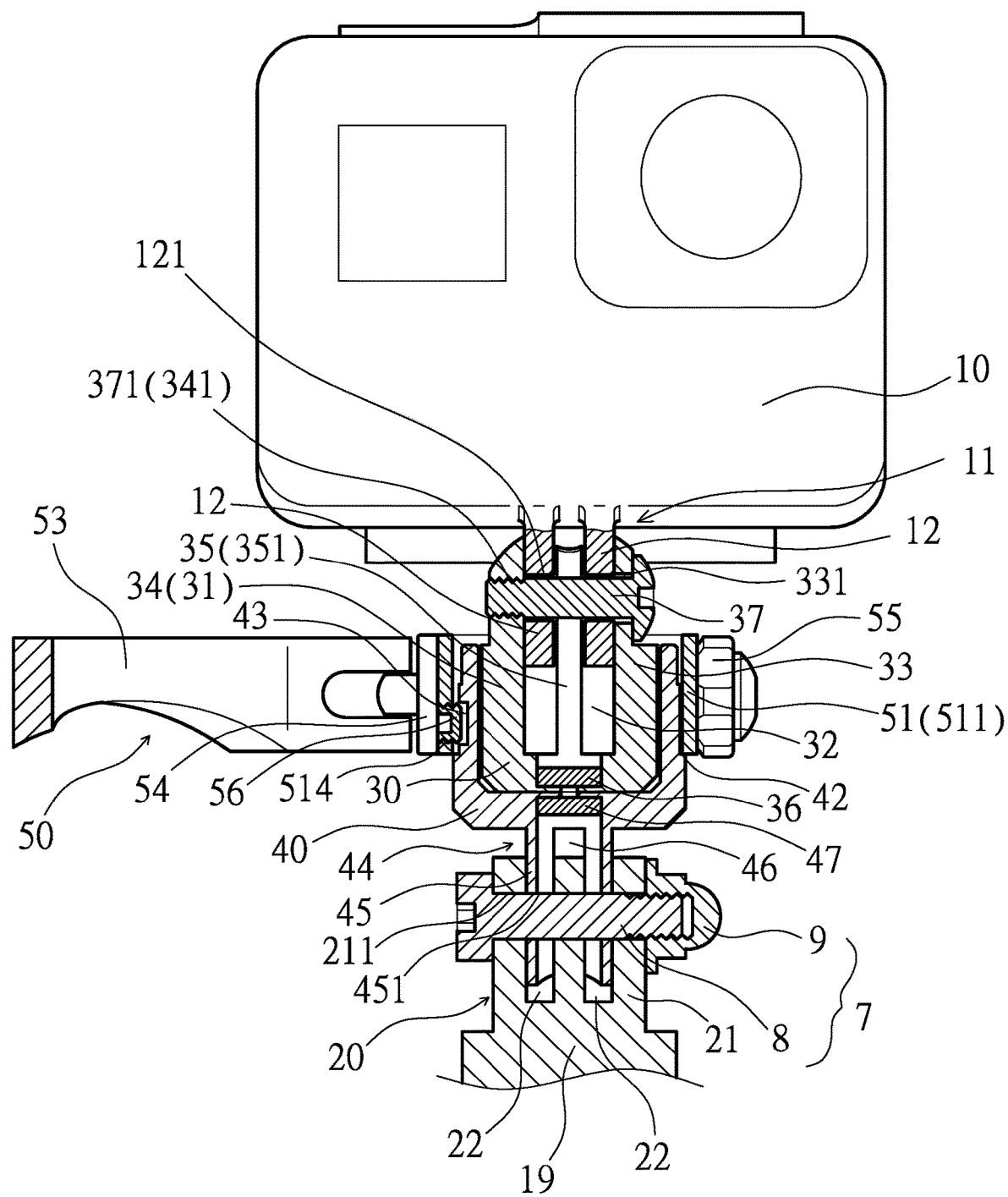
FIG. 5 is an assembled sectional view of the present invention in a loose state.
Figure 6:
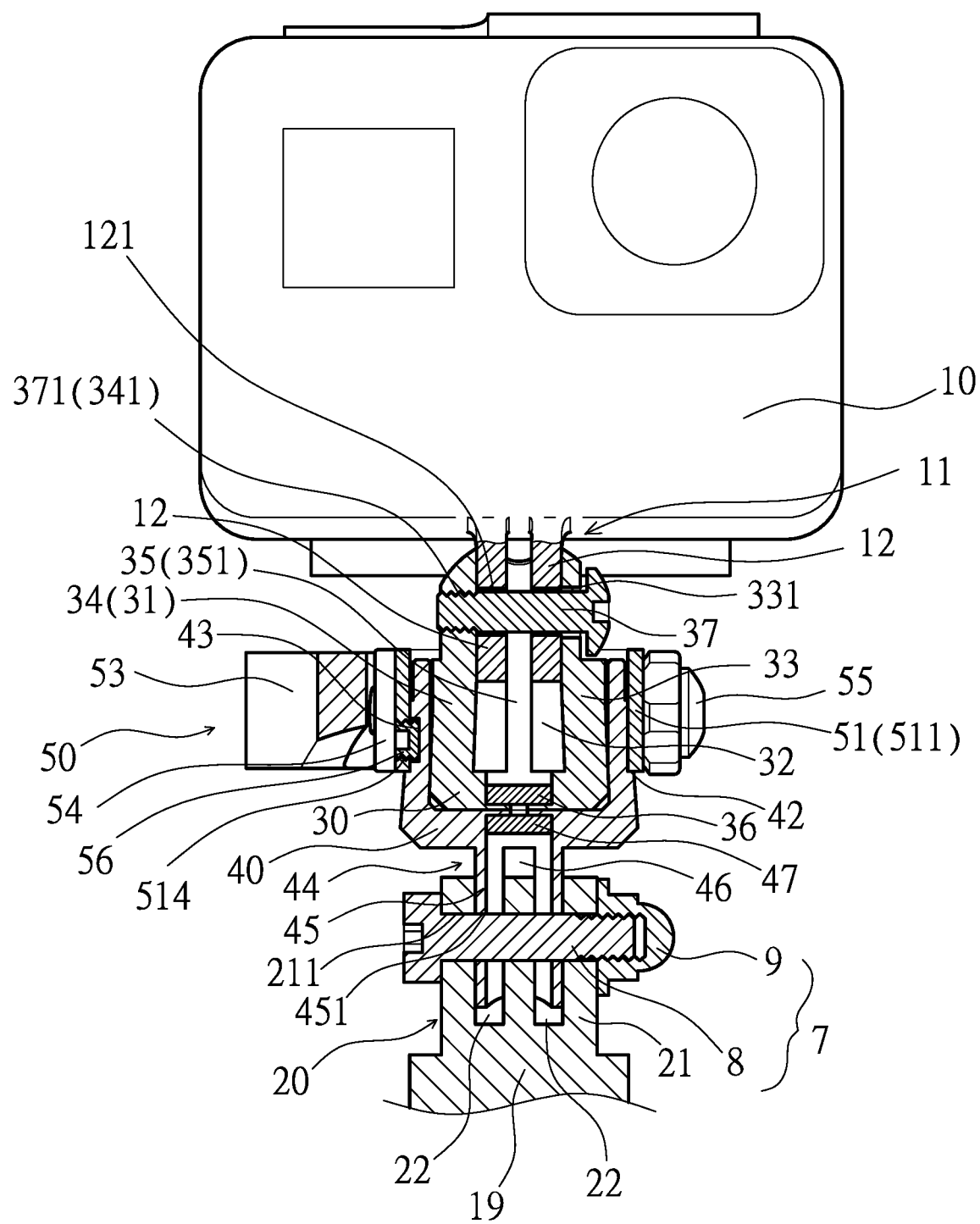
FIG. 6 is an assembled sectional view of the present invention in a tight state.

Referring to FIG. 3 to FIG. 6, a quick-release mounting structure of an action camera casing comprises a casing 10 for accommodating an action camera, an insert member 30, a circular sleeve 40, a fixing member 19, and a quick-release assembly 50.

The underside of the casing 10 is provided with a coupling portion 11. The coupling portion 11 has two parallel lugs 12. The lugs 12 each have a through hole 121 in the same axial direction.

The insert member 30 is in a cylindrical shape and has a pivot end 31 at an upper end thereof. The pivot end 31 is provided with two slots 32 parallel to the axial direction of the insert member 30, so that two sides of the pivot end 31 are formed with a first side plate 33 and a second side plate 34, respectively. A partition 35 is disposed between the two slots 32. The central portion of the partition 35 is formed with a notch 351 extending to the bottoms of the slots 32. A first magnetic member 36 is disposed in the notch 351 close to the bottom of the insert member 30. The first side plate 33 has a pivot hole 331. The second side plate 34 has a screw hole 341 corresponding to the pivot hole 331. The lugs 12 are inserted in the slots 32 of the pivot end 31, respectively. The pivot end 31 and the coupling portion 11 are pivotally connected together by a coupling bolt 37. The distal end of the coupling bolt 37 is provided with a threaded portion 371. The coupling bolt 37 is inserted through the pivot hole 331 of the first side plate 33 and the notch 351 of the partition 35, and the threaded portion 371 of the coupling bolt 37 is screwed into the screw hole 341 of the second side plate 34.

The circular sleeve 40 is provided with an axial slit 41. The outer circumference of the circular sleeve 40 is provided with a radial limiting edge 42. The outer diameter of the circular sleeve 40 above the limiting edge 42 is less than the outer diameter of the circular sleeve 40 below the limiting edge 42. The outer circumference of the circular sleeve 40 above the limiting edge 42 is provided with a positioning hole 43. The underside of the circular sleeve 40 is provided with a coupling end 44. The coupling end 44 has two parallel coupling plates 45 and a space 46 defined between the coupling plates 45. The coupling plates 45 each have a coupling hole 451 in the same axial direction. The underside of the circular sleeve 40 is provided with a second magnetic member 47 that is located at the central portion of the space 46 and corresponds to the first magnetic member 36. The insert member 30 is inserted into the circular sleeve 40. The first magnetic member 36 and the second magnetic member 47 are attracted to each other.

The fixing member 19 is provided with a pivot portion 20. The pivot portion 20 has three parallel pivot plates 21 so that the pivot portion 20 is formed with two grooves 22. The pivot plates 21 each have a shaft hole 211 in the same axial direction. The coupling plates 45 are inserted into the grooves 22 of the pivot portion 20, respectively. The pivot portion 20 and the coupling end 44 are pivotally connected together by a bolt assembly 7. The bolt assembly 7 includes a screw 8 and a nut 9. The screw 8 is inserted through the shaft holes 211 of the pivot plates 21 and the coupling holes 451 of the coupling plates 45, and then is locked by the nut 9.

The quick-release assembly 50 includes a fastening collar 51, a shaft 52 having an eccentric rotating handle 53, a pressing block 54, and a nut 55. The fastening collar 51 has a C-shaped body portion 511. Two ends of the C-shaped body portion 511 are provided with end seats 512 each having an aperture 513. The C-shaped body portion 511 is provided with a positioning screw hole 514. The C-shaped body portion 511 of the fastening collar 51 is fitted onto the circular sleeve 40. The limiting edge 42 abuts against the lower edge of the C-shaped body portion 511 to obtain an optimal fitting position. The positioning screw hole 514 is aligned with the positioning hole 43. A set screw 56 is locked into the positioning screw hole 514 and extends into the positioning hole 43, so that the quick-release assembly 50 does not disengage from the circular sleeve 40 and is retained in one direction. One end of the shaft 52, facing away from the eccentric rotating handle 53, is provided with an external thread 521. The shaft 52 is inserted through the pressing block 54 and the apertures 513 of the end seats 512. The nut 55 is screwed to the external thread 521 of the shaft 52. The eccentric rotating handle 53 is pulled for the pressing block 54 to tighten the end seats 512 of the fastening collar 51. The two end seats 512 are pressed to approach each other, so that the C-shaped body portion 511 is configured to tighten and compress the circular sleeve 40 to clamp the insert member 30. At the same time, the pivot end 31 clamps the coupling portion 11. With the above structure, the insert member 30 is inserted in the circular sleeve 40 and can be loosened and fastened by the quick-release assembly 50, thereby achieving the effect of fastening and loosening the pivots. Through the first magnetic member 36 and the second magnetic member 47 to attract each other temporarily, it is possible to prevent the detachment of the insert member 30 when not fastened.

The assembly and function of the present invention are described in detail below. Referring to FIG. 3 to FIG. 6, when the eccentric rotating handle 53 of the present invention is tightened, the L-shaped eccentric rotating handle 53 is pressed against the periphery of the C-shaped body portion 511. The eccentric rotating handle 53 leans against the fastening collar 51, and is located at the lower edge of the casing 10. In this way, when the eccentric rotating handle 53 is in a tight state, the length extending outward of the eccentric rotating handle 53 can be shortened greatly. This not only saves space but also prevents the eccentric rotating handle 53 from being pulled accidentally to loosen the quick-release assembly 50. Moreover, the insert member 30 and the circular sleeve 40 may be made of a hard plastic or metal material (for example, aluminum alloy). The harder material is able to withstand the wear and tear of frequent disassembly and assembly, and has the ability of elastic deformation. When the insert member 30 is inserted into the circular sleeve 40, the first magnetic member 36 and the second magnetic member 47 attract each other to avoid the problem that the insert member 30 is disengaged from the circular sleeve 4 when the quick-release assembly 50 is not tightened. Preferably, the first magnetic member 36 and the second magnetic member 47 are neodymium-iron-boron magnets, and are attracted to each other with different magnetic poles. The material has stronger magnetic force but is less resistant to collision. Therefore, the first magnetic member 36 is disposed at the bottom inside the insert member 30 and the second magnetic member 47 is disposed at the underside of the circular sleeve 40 to protect the first magnetic member 36 and the second magnetic member 47 from colliding with each other. One of the first magnetic member 36 and the second magnetic member 47 may be a neodymium-iron-boron magnet, and the other is made of a ferromagnetic material for the first magnetic member 36 and the second magnetic member 47 to attract each other.

When assembled, first, the fastening collar 51 is fitted onto the circular sleeve 40 and leans against the limiting edge 42. The C-shaped body portion 511 is rotated to align the positioning screw hole 514 with the positioning hole 43. The set screw 56 is locked into the positioning screw hole 514 and extends into the positioning hole 43, so that the fastening collar 51 does not disengage from the circular sleeve 40 and is retained in one direction. The shaft 52 is inserted through the pressing block 54 and the apertures 513 of the end seats 512. The nut 55 is screwed to the external thread 521 of the shaft 52 to prevent the shaft 52 from coming off the fastening collar 51. Then, the casing 10 and the insert member 30 are pivotally connected together by the coupling bolt 37. At this time, the coupling portion 11 and the pivot end 31 are not fastened excessively. The coupling portion 11 of the casing 10 and the pivot end 31 of the insert member 30 can be pivoted relatively freely to adjust the angle of the casing 10. Furthermore, the other end of the insert member 30 is inserted into the circular sleeve 40. When the circular sleeve 40 is not fastened, the insert member 30 can freely rotate in the circular sleeve 40 to adjust the direction of the casing 10. At this time, the first magnetic member 36 and the second magnetic member 47 attract each other to assist the positioning of the insert member 30, so that the insert member 30 won't disengage from the circular sleeve 40 during rotation. After the angle and direction of the casing 10 are adjusted, the eccentric rotating handle 53 is rotated, enabling the pressing block 54 and the nut 55 to press the end seats 512 of the fastening collar 51 to approach each other. In this way, the C-shaped body portion 511 is tightened to press the circular sleeve 40 further to reduce the slit 41, so that the insert member 30 is fastened by the circular sleeve 40 and cannot be rotated; meanwhile, the pivot end 31 is fastened by the circular sleeve 40, so that the first side plate 33 and the second side plate 34 are deformed toward the slots 32 by the external force, and the lugs 12 inserted into the slots 32 are fastened and cannot be turned. Because only one end of the coupling bolt 37 is fixed (the threaded portion 371 of the coupling bolt 37 is screwed to the screw hole 341 of the second side plate 34), the deformation of the pivot end 31 when pressed by an external force is not affected, such that the coupling portion 11 of the casing 10 can be clamped firmly. When the user wants to change the angle of the casing 10 of the present invention, the eccentric rotating handle 53 is turned to loosen the shaft 52, so that the two end seats 512 of the fastening collar 51 are separated by a large distance, the C-shaped body portion 511 releases the circular sleeve 40, the insert member 30 is not clamped tightly, and the pivot end 31 does not clamp the lugs 12 of the coupling portion 11. In this way, the insert member 30 can be pivoted freely in the circular sleeve 40, and the angle of the coupling portion 12 of the casing 10 can be adjusted relative to the pivot end 31. When the casing 10 needs to change the fixing member 19 used for different objects (for example, a clamp, a selfie stick, a bonded seat, etc.), the eccentric rotating handle 53 is pulled to loosen the circular sleeve 40, so that the insert member 30 can be detached and then inserted into the circular sleeve 40 of the fixing member 19 of the other object. With the above structure, the casing 10 equipped with the action camera is pivotally connected to the insert member 30, and the insert member 30 is inserted in the circular sleeve 40 to be loosened and fastened by the quick-release assembly 50, thereby achieving the effect of fastening and loosening the pivots. Through the first magnetic member 36 and the second magnetic member 47 to attract each other temporarily, it is possible to prevent the detachment of the insert member 30 when not fastened.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick-release mounting structure of an action camera casing, comprising a casing for accommodating an action camera, an insert member, a circular sleeve, a fixing member, and a quick-release assembly;
   an underside of the casing being provided with a coupling portion, the coupling portion having two parallel lugs;
   the insert member being in a cylindrical shape and having a pivot end at an upper end thereof, the pivot end being provided with two slots parallel to an axial direction of the insert member, two sides of the pivot end being formed with a first side plate and a second side plate respectively, a partition being disposed between the two slots, the lugs being inserted in the slots of the pivot end respectively, the pivot end and the coupling portion being pivotally connected together by a coupling bolt;
   the circular sleeve being provided with an axial slit, an underside of the circular sleeve being provided with a coupling end, the coupling end having two parallel coupling plates and a space defined between the coupling plates, the insert member being inserted into the circular sleeve;
   the fixing member being provided with a pivot portion, the pivot portion having three parallel pivot plates so that the pivot portion is formed with two grooves, the coupling plates being inserted into the grooves of the pivot portion respectively, the pivot portion and the coupling end being pivotally connected together by a bolt assembly; the quick-release assembly including a fastening collar, the fastening collar being fitted onto the circular sleeve, the quick-release assembly being configured to tighten the fastening collar for fastening the circular sleeve so that the circular sleeve is pressed to clamp the insert member and the pivot end is deformed to clamp the coupling portion.

2. The quick-release mounting structure of the action camera casing as claimed in claim 1, wherein the quick-release assembly further includes a shaft having an eccentric rotating handle, a pressing block and a nut, the fastening collar has a C-shaped body portion, two ends of the C-shaped body portion are provided with end seats each having an aperture; the C-shaped body portion is fitted onto the circular sleeve, one end of the shaft, facing away from the eccentric rotating handle, is provided with an external thread, the shaft is inserted through the pressing block and the apertures of the end seats, the nut is screwed to the external thread of the shaft, and the eccentric rotating handle is pulled for the pressing block to tighten the end seats of the fastening collar.

3. The quick-release mounting structure of the action camera casing as claimed in claim 2, wherein the eccentric rotating handle is substantially L-shaped to lean against a periphery of the C-shaped body portion when the eccentric rotating handle is fastened.

4. The quick-release mounting structure of the action camera casing as claimed in claim 1, wherein a central portion of the partition is formed with a notch extending to bottoms of the slots, a first magnetic member is disposed in the notch close to a bottom of the insert member, and the underside of the circular sleeve is provided with a second magnetic member that is located at a central portion of the space and corresponds to the first magnetic member.

5. The quick-release mounting structure of the action camera casing as claimed in claim 4, wherein the lugs each have a through hole, the first side plate has a pivot hole, the second side plate has a screw hole corresponding to the pivot hole, a distal end of the coupling bolt is provided with a threaded portion, the coupling bolt is inserted through the pivot hole of the first side plate and the notch of the partition, and the threaded portion of the coupling bolt is screwed into the screw hole of the second side plate.

6. The quick-release mounting structure of the action camera casing as claimed in claim 4, wherein the first magnetic member and the second magnetic member are neodymium-iron-boron magnets.

7. The quick-release mounting structure of the action camera casing as claimed in claim 4, wherein one of the first magnetic member and the second magnetic member is a neodymium-iron-boron magnet, and the other is made of a ferromagnetic material.

8. The quick-release mounting structure of the action camera casing as claimed in claim 1, wherein an outer circumference of the circular sleeve is provided with a radial limiting edge, an outer diameter of the circular sleeve above the limiting edge is less than an outer diameter of the circular sleeve below the limiting edge, and the limiting edge abuts against a lower edge of the C-shaped body portion to obtain an optimal fitting position.

9. The quick-release mounting structure of the action camera casing as claimed in claim 8, wherein the outer circumference of the circular sleeve above the limiting edge is provided with a positioning hole, the C-shaped body portion is provided with a positioning screw hole, the positioning screw hole is aligned with the positioning hole, and a set screw is locked into the positioning screw hole and extends into the positioning hole.

10. The quick-release mounting structure of the action camera casing as claimed in claim 1, wherein the coupling plates each have a coupling hole, the pivot plates each have a shaft hole, the bolt assembly includes a screw and a nut, the screw is inserted through the shaft holes of the pivot plates and the coupling holes of the coupling plates and locked by the nut.

* * * * *